United States Patent
Sano et al.

(10) Patent No.: US 9,903,722 B2
(45) Date of Patent: Feb. 27, 2018

(54) ELECTRONIC DEVICE

(71) Applicant: FUJITSU TEN LIMITED, Kobe-shi, Hyogo (JP)

(72) Inventors: Tetsuo Sano, Kobe (JP); Takahiro Jo, Kobe (JP); Hideo Arai, Kobe (JP)

(73) Assignee: FUJITSU TEN LIMITED, Kobe-shi, Hyogo (JP)

( * ) Notice: Subject to any disclaimer, the term of this patent is extended or adjusted under 35 U.S.C. 154(b) by 0 days.

(21) Appl. No.: 15/100,423

(22) PCT Filed: Feb. 19, 2015

(86) PCT No.: PCT/JP2015/054642
§ 371 (c)(1),
(2) Date: May 31, 2016

(87) PCT Pub. No.: WO2015/151633
PCT Pub. Date: Oct. 8, 2015

(65) Prior Publication Data
US 2016/0305786 A1    Oct. 20, 2016

(30) Foreign Application Priority Data
Mar. 31, 2014    (JP) .................. 2014-071864

(51) Int. Cl.
*G01C 21/26*    (2006.01)
*B60K 35/00*    (2006.01)

(52) U.S. Cl.
CPC .......... *G01C 21/265* (2013.01); *B60K 35/00* (2013.01); *B60K 2350/104* (2013.01); *B60K 2350/1032* (2013.01)

(58) Field of Classification Search
CPC .............. B60K 37/02; B60K 35/00; B60K 2350/1032; B60K 2350/104; G01C 17/00; G01C 21/16; G01C 21/3476; G01C 21/265
USPC ..................................... 361/679.01
See application file for complete search history.

(56) References Cited

U.S. PATENT DOCUMENTS

2004/0261301 A1* 12/2004 Vering ............... E02F 3/404
                                                                        37/403

FOREIGN PATENT DOCUMENTS

JP    2004-210191 A    7/2004
JP    2005-116620 A    4/2005

OTHER PUBLICATIONS

May 26, 2015 Written Opinion issued in International Patent Application No. PCT/JP2015/054642.
May 26, 2015 International Search Report issued in International Patent Application No. PCT/JP2015/054642.
Nov. 27, 2017 Search Report issued in European Patent Application No. 15773955.8.

* cited by examiner

*Primary Examiner* — Anthony Haughton
*Assistant Examiner* — Ingrid Wright
(74) *Attorney, Agent, or Firm* — Oliff PLC

(57) ABSTRACT

A display panel can transition between a fixed state and an inclined state, in accordance with linear reciprocal movement relative to a main body section of a main slider. When the main slider travels a prescribed distance in the forward direction from a position in the fixed state, a motion link comes in contact with the main slider.

4 Claims, 10 Drawing Sheets

ELECTRONIC DEVICE

TECHNICAL FIELD

The present invention relates to an electronic device including a main body having a fixing surface and a display unit capable of taking an inclined posture relative to the fixing surface.

BACKGROUND ART

As a kind of the electronic device, a navigation device that is to be mounted on a vehicle or the like has been known. The navigation device includes a main body having a fixing surface in which a medium insertion opening is formed and a display unit having a display surface for displaying information. The display unit can take a fixed state in which the display unit is fixed to the fixing surface and an inclined state in which the display unit takes an inclined posture relative to the fixing surface. When the display unit is in the inclined state, the medium insertion opening is exposed, so that a medium can be inserted or discharged. When the display unit is in the fixed state, the medium insertion opening is covered by the display unit. When the display unit is in the fixed state, the display unit takes a posture parallel with the fixing surface. A transition operation of the display unit from the fixed state to the inclined state is also referred to as a tilt operation.

Patent Literature 1 discloses an electronic device having a mechanism configured to enable the tilt operation. A display unit of the display device disclosed in Patent Literature 1 is supported by a plurality of arms. The display unit is configured to be rotatable about a support point of each arm. The electronic device disclosed in Patent Literature 1 has a movement part and a motor. The movement part is configured to be moveable in a front-back direction with respect to a main body by an operation of the motor. A front end portion of the movement part is fixed to one of the plurality of arms. As the movement part moves forwards, the display unit transitions to the inclined state.

CITATION LIST

Patent Literature

Patent Literature 1: JP-A-2005-116620

SUMMARY OF INVENTION

Technical Problem

However, when the movement part moves forwards and thus the display panel transitions to the inclined state, if vibrations of a vehicle body accompanied by traveling of a vehicle are transmitted to the electronic device, an abnormal sound may be caused to each member of the electronic device. Specifically, the movement part moves forwards, so that the moment of the arm increases. Further, the arm is configured to support the display panel having a predetermined weight. At this state, when the vibrations accompanied by the traveling of the vehicle are transmitted to the electronic device, the display panel shakes up and down and the movement part is relatively largely bent, so that load is applied to each member of the electronic device and the abnormal sound is thus generated.

It is therefore an object of the present invention to suppress an abnormal sound upon change in posture of a display unit of an electronic device and in an inclined state.

Solution to Problem

In order to achieve the above object, according to an aspect of the present invention, there is provided an electronic device. The electronic device includes:

a main body fixed to a fixing target and having a fixing surface, a display unit having a display surface for displaying information, a first movement part connected to a lower end of the display unit and configured to linearly reciprocally move relative to the main body, a second movement part configured to reciprocally move in parallel with the first movement part, a support part configured to support the display unit, a first connection part to which a lower end portion of the display unit is to be connected to be rotatable relative to the first movement part, a second connection part provided between the lower end portion and an upper end portion of the display unit and to which the display unit and one end portion of the support part are to be connected to be relatively rotatable, and a third connection part to which the other end portion of the support part is to be connected to be rotatable relative to the second movement part.

The display unit can transition between a fixed state and an inclined state in accordance with the reciprocal movement of the first movement part.

In the fixed state, the upper end portion and the rear end portion of the display unit are fixed to the fixing surface.

In the inclined state, the display unit is spaced from the fixing surface and the display surface faces upwards obliquely.

When the first movement part moves forwards by a first distance from a position in the fixed state, the support part is contacted to the first movement part.

According to the above configuration, the bending of the first movement part, which is caused due to the vibrations to be transmitted from the fixing target, is suppressed, so that it is possible to suppress an abnormal sound from each member upon change in posture of the display unit and in the inclined state. Also, the stability of a posture change operation of the display unit is improved.

The electronic device can be configured as follows.

The first movement part is configured to further move forwards by a second distance after the first movement part is contacted to the support part until the display unit reaches the inclined state.

According to the above configuration, the rigidity of the first movement part against the vibrations transmitted to be from the fixing target is further increased. Therefore, the bending of the first movement part is further suppressed, so that it is possible to further suppress the abnormal sound from each member upon change in posture of the display unit and in the inclined state.

The electronic device can be configured as follows.

The support part has a bent shape so as to form a corner part convex towards the first movement part, and the corner part is in contact with the first movement part.

According to the above configuration, the bending of the first movement part is immediately suppressed after the display unit starts to transition to the inclined state. Therefore, it is possible to further suppress the abnormal sound from each member upon change in posture of the display unit and in the inclined state.

The electronic device can be configured as follows.

The first movement part has a sliding path extending in a direction of the reciprocal movement, a coupling pin inserted into the second movement part and the sliding path and configured to slide along the sliding path is provided, the coupling pin is positioned between a front end portion and a rear end portion of the sliding path when the first movement part and the support part are first contacted to each other, and the coupling pin is engaged with the rear end portion of the sliding path when the first movement part moves forwards by the second distance.

According to the above configuration, since the coupling pin is engaged with the rear end portion of the sliding path in the inclined state of the display unit, even though the vibrations are transmitted from the fixing target, it is possible to suppress displacement and deformation of the first movement part and shaking of the display unit. Therefore, it is possible to further suppress the abnormal sound from each member upon change in posture of the display unit and in the inclined state. Also, the stability of the posture change operation of the display unit is secured.

DESCRIPTION OF EMBODIMENTS

Hereinafter, illustrative embodiments will be described in detail with reference to the accompanying drawings.

1. First Illustrative Embodiment

<1-1. Outline of Electronic Device>

Figure 1:
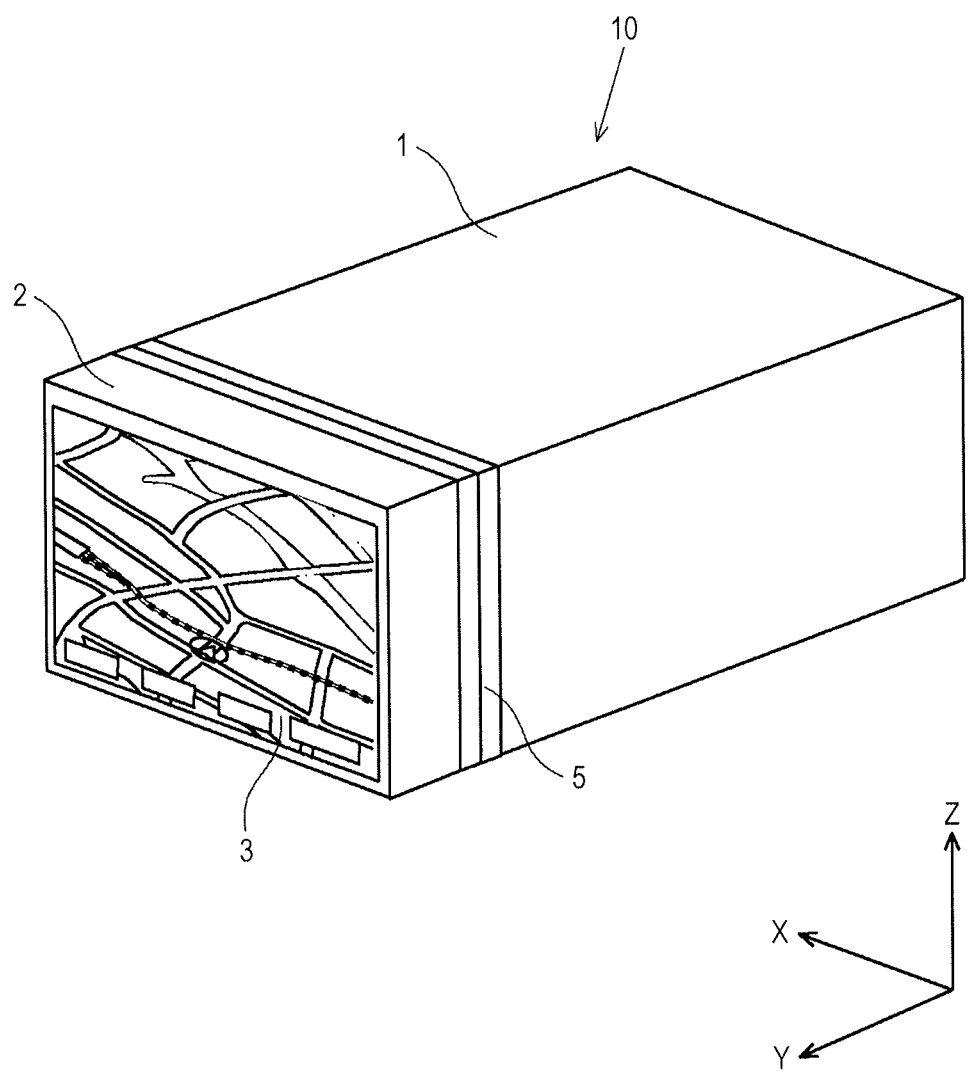
FIG. 1 is a view depicting an outward appearance of an electronic device according to an illustrative embodiment.

FIG. 1 depicts an outward appearance of an electronic device 10 according to an illustrative embodiment. The electronic device 10 is a device that is to be mounted on a vehicle such as an automobile and is to be used in a vehicle interior. The electronic device 10 has a navigation function of guiding a route to a destination and an audio function of outputting voice into the vehicle interior.

In below description, a three dimensional Cartesian coordinate system (XYZ) shown in the drawings is used to appropriately indicate directions and orientations. The Cartesian coordinate system is relatively fixed to a main body 1. An X-axis direction corresponds to a left-right direction, a Y-axis direction corresponds to a front-back direction, and a Z-axis direction corresponds to an upper-lower direction. A +X-side is a left side of a display surface of a display panel 2, and a −X-side is a right side of the display surface. A +Y-side is a front side of the display surface, and a −Y-side is a backside of the display surface. A +Z-side is an upper side and a −Z-side is a lower side.

The electronic device 10 has a main body 1, a display panel 2 and a front panel 5.

Figure 2:
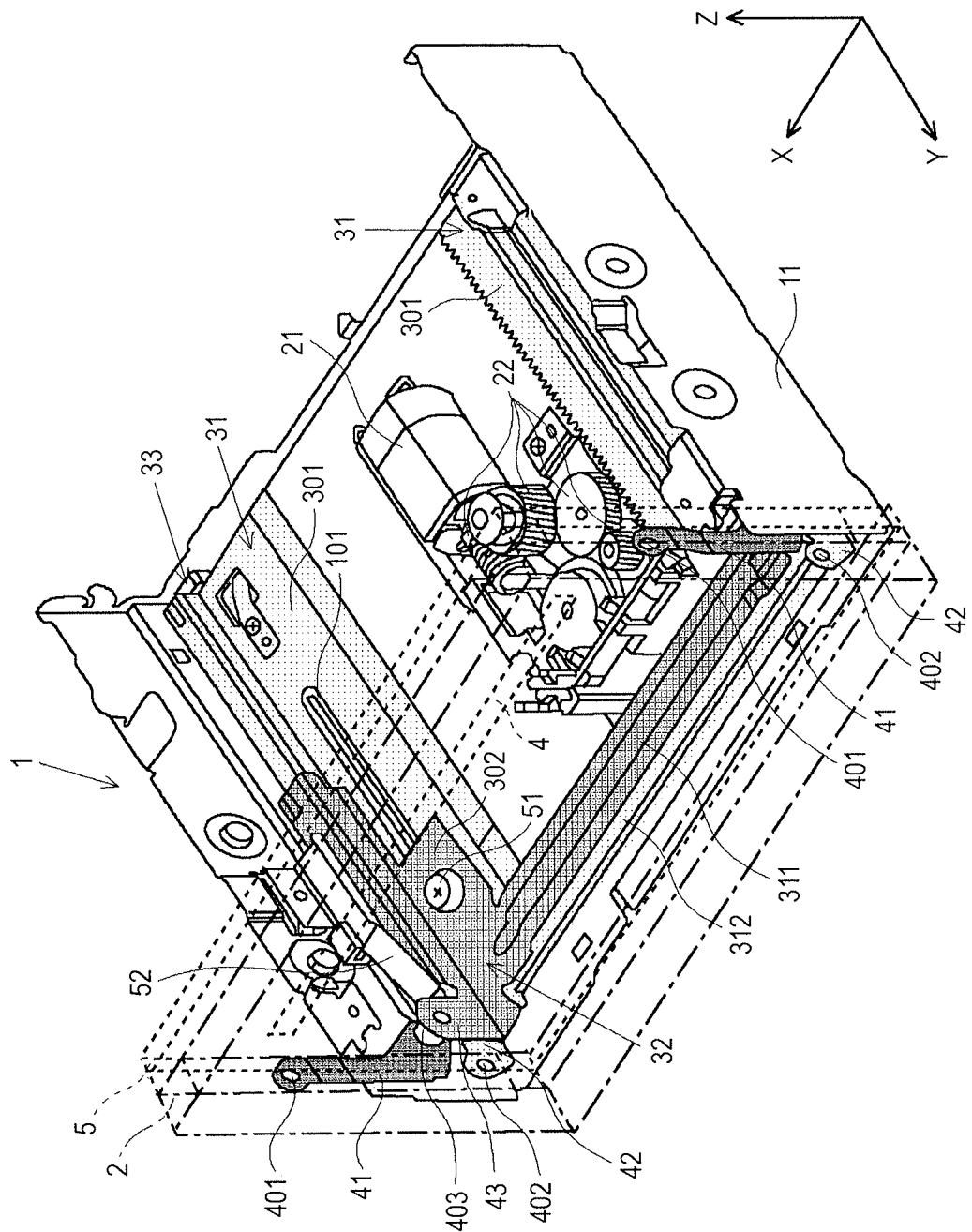
FIG. 2 is a perspective view depicting a part of the electronic device in a fixed state of a display panel.

As shown in FIG. 2, the main body 1 has a chassis 11. In the chassis 11, a plurality of components for implementing a variety of functions of the electronic device 10 is accommodated.

As shown in FIG. 1, the display panel 2 has a display 3 (an example of the display surface) such as a liquid crystal monitor. The display surface of the display panel 2 has a substantially rectangular shape having a longitudinal direction and a width direction. The display panel 2 functions as the display unit of the electronic device 10.

The display 3 has a touch panel. The display 3 is configured to receive a user's operation. The user can input a variety of instructions into the electronic device 10 by touching command buttons displayed on the display 3. As a result, the main body 1 is configured to execute diverse processing, in response to the user's operation performed on the display panel 2. The display panel 2 may have a physical operation button with which the user inputs an instruction.

The front panel 5 (an example of the fixing surface) is provided at a front part of the main body 1. As shown in FIG. 2, the front panel 5 has a disc insertion opening 4. When the display panel 2 is in a fixed state, the disc insertion opening 4 is covered by the display panel 2.

2. Configuration of Electronic Device

In the below, a configuration of the electronic device 10 is described. First, a configuration is described when the display panel 2 is in the fixed state, with reference to FIGS. 2 to 4. In these drawings, some members are shown with being projected for convenience of explanation.

As shown in FIG. 2, the display panel 2 is provided in front of (the +Y direction) the front panel 5. When the display panel 2 is in the fixed state, the display panel 2 covers the substantially entire surface (front surface) of the front panel 5. Thereby, the disc insertion opening 4 is covered by the display panel 2.

The electronic device 10 has a motor 21, a plurality of gears 22 and a main slider 31. The motor 21, the plurality of gears 22 and the main slider 31 are provided on a bottom of the chassis 11. The motor 21 is configured to generate a driving force. The plurality of gears 22 is configured to transmit the driving force of the motor 21 to the main slider 31.

The main slider 31 (an example of the first movement part) has a pair of left and right (the X-axis direction) sliding members 301 and a coupling member 311. The pair of sliding members 301 extends in the front-back direction (the Y-axis direction) of the chassis 11. Both sides of the chassis 11 are provided with a pair of guide rails 33. Each sliding member 301 is engaged with the corresponding guide rail 33 and is kept to freely slide in the front-back direction (the Y-axis direction) of the chassis 11. The coupling member 311 extends in the left-right direction (the X-axis direction) of the chassis 11 and is configured to couple front end portions of the pair of sliding members 301. The main slider 31 is configured to slide in the front-back direction (the Y-axis direction), which is a direction intersecting with the front panel 5, by the driving force generated from the motor 21.

Figure 3:
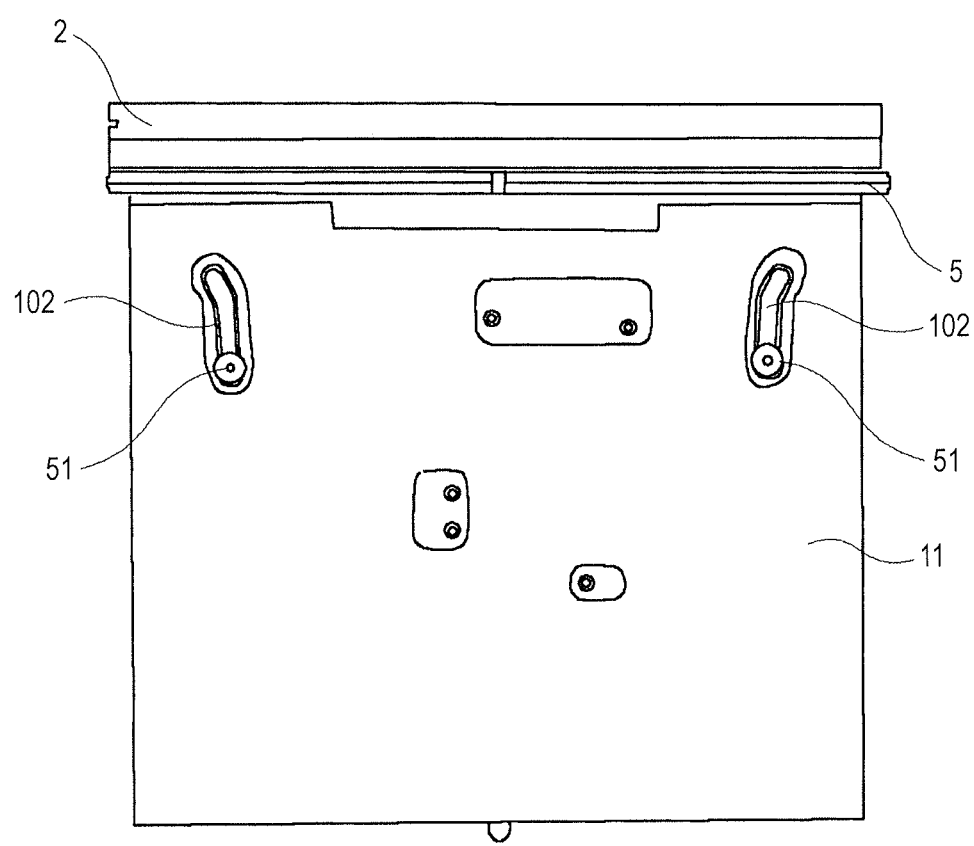
FIG. 3 is a bottom view depicting a part of the electronic device in the fixed state of the display panel.

Each sliding member 301 is formed with a pin sliding path 101. The pin sliding path 101 is a long hole extending in the front-back direction (the Y-axis direction) of the chassis 11. As shown in FIG. 3, a pair of guide paths 102 is formed at a front part of a bottom surface of the chassis 11. A front end portion of each pin sliding path 101 overlaps with a rear end portion of the corresponding guide path 102, as seen from the Z-axis direction. The electronic device 10 has a pair of coupling pins 51. Each coupling pin 51 is inserted into the corresponding pin sliding path 101 and the corresponding guide path 102.

Each coupling pin 51 has a barrel cylinder having a flange (not shown) inserted into the part at which the pin sliding path 101 and the guide path 102 overlap each other, a friction ring fitted to the barrel cylinder and a screw screwed to the barrel cylinder.

As shown in FIG. 2, the electronic device 10 has a sub-slider 32 (an example of the second movement part). The sub-slider 32 has a pair of sliding members 302 and a connection member 312. The pair of sliding members 302 extends in the front-back direction (the Y-axis direction) of the chassis 11. Each sliding member 302 is engaged with the corresponding guide rail 33 and is kept to freely slide in the front-back direction (the Y-axis direction) of the chassis 11. The connection member 312 extends in the left-right direction (the X-axis direction) of the chassis 11, and is configured to couple front end portions of the pair of sliding members 302. Each coupling pin 51 is inserted into a predetermined part of the corresponding sliding member 302 in the upper-lower direction (the Z-axis direction).

Figure 4:
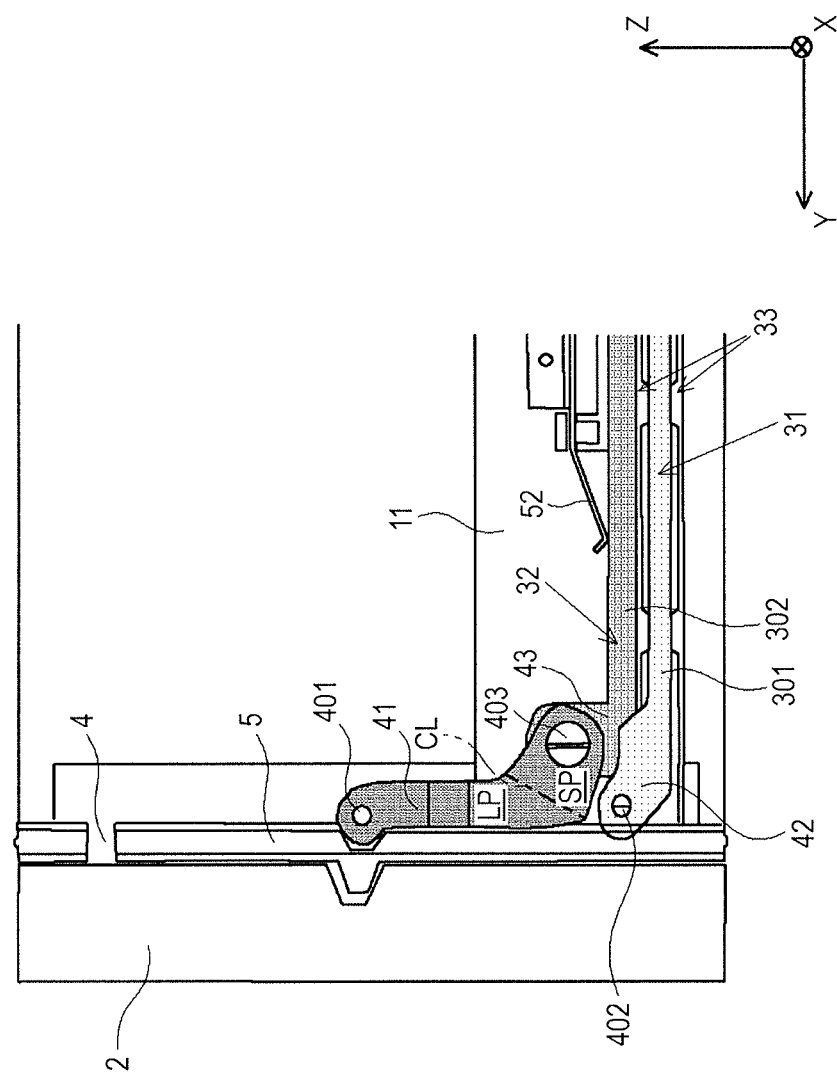
FIG. 4 is a side view depicting a part of the electronic device in the fixed state of the display panel.

A pair of plate springs 52, which are elastic members, is provided in the vicinity of left and right sides (the X-axis direction) of the chassis 11. As shown in FIG. 4, each plate spring 52 is in contact with the corresponding sliding member 302 of the sub-slider 32. Each plate spring 52 is configured to press the corresponding sliding member 302 towards the corresponding sliding member 301 of the main slider 31.

As shown in FIG. 2, the display panel 2 has a pair of shafts 401 and a pair of shafts 402. The pair of shafts 401 is provided at substantially central portions in the upper-lower direction of left and right sides of the display panel 2. The pair of shafts 402 is provided at lower portions in the upper-lower direction of left and right sides of the display panel 2. The sub-slider 32 has a pair of shafts 403. Also, the front end portion of each sliding member 302 of the sub-slider 32 forms an arm part 43. Each shaft 403 is provided at the corresponding arm part 43.

The electronic device 10 has a pair of motion links 41 (an example of the support part). As shown in FIG. 4, each motion link 41 is a member having a first part LP and a second part SP. The first part LP is longer than the second part SP. The first part LP and the second part SP extend in intersecting directions and form a bent part CL. When the display panel 2 is in the fixed state, each of the first parts LP extends in the upper-lower direction and each of the second parts SP extends in the front-back direction. Each of the first parts LP is rotatably connected to the corresponding shaft 401 (which is an example of the second connection part). Each of the second parts SP is rotatably connected to the corresponding shaft 403 (which is an example of the third connection part). Thereby, one end portion of each motion link 41 and the display panel 2 are configured to freely rotate relative to each other about the corresponding shaft 401. The other end portion of each motion link 41 is configured to freely rotate relative to the sub-slider 32 about the corresponding shaft 403.

The front end portion of each sliding member 301 of the main slider 31 forms an arm part 42. Each arm part 42 is rotatably connected to the corresponding shaft 402 (which is an example of the first connection part). Thereby, the display panel 2 is configured to be rotatable relative to each arm part 42 about the corresponding shaft 402. As described above, each sliding member 301 is engaged with the corresponding guide rail 33 provided for the chassis 11, and is kept to freely slide in the front-back direction (the Y-axis direction). As shown in FIG. 4, each guide rail 33 has a plurality of convex portions. The plurality of convex portions is arranged at different positions in the front-back direction (the Y-axis direction). The plurality of convex portions is arranged at positions facing the sliding member 301. The plurality of convex portions is kept to sandwich the sliding member 301 in the upper-lower direction. Each sliding member 302 of the sub-slider 32 is provided on the corresponding guide rail 33.

3. Change in Posture of Display Panel

In the below, change in posture of the display panel 2 is described. First, a forward (the +Y direction) moving process of the display panel 2 from the fixed state of FIG. 2 is described with reference to FIGS. 5 to 7.

Figure 5:
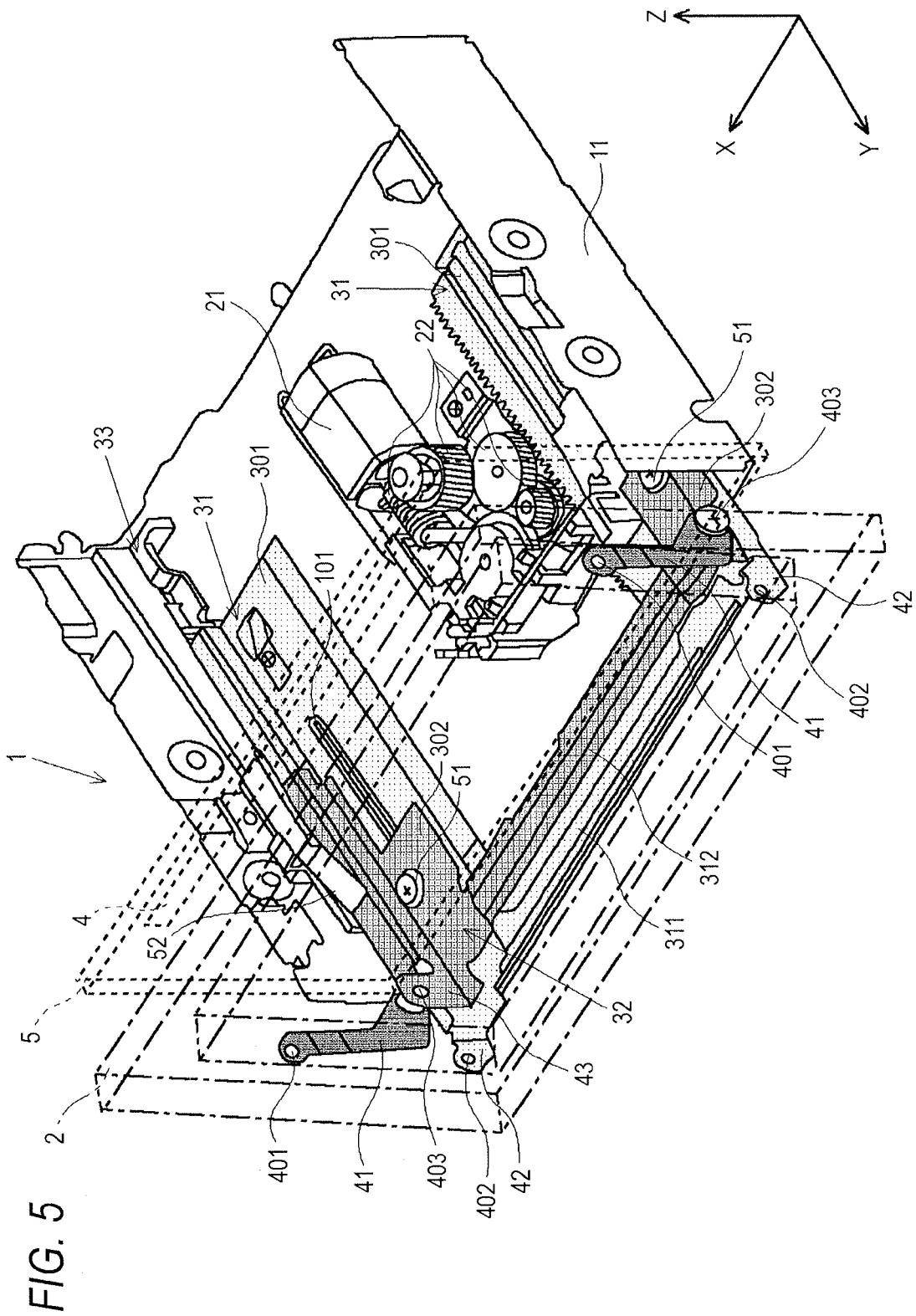
FIG. 5 is a perspective view depicting a part of the electronic device in a state where the display panel has moved forwards.
Figure 7:
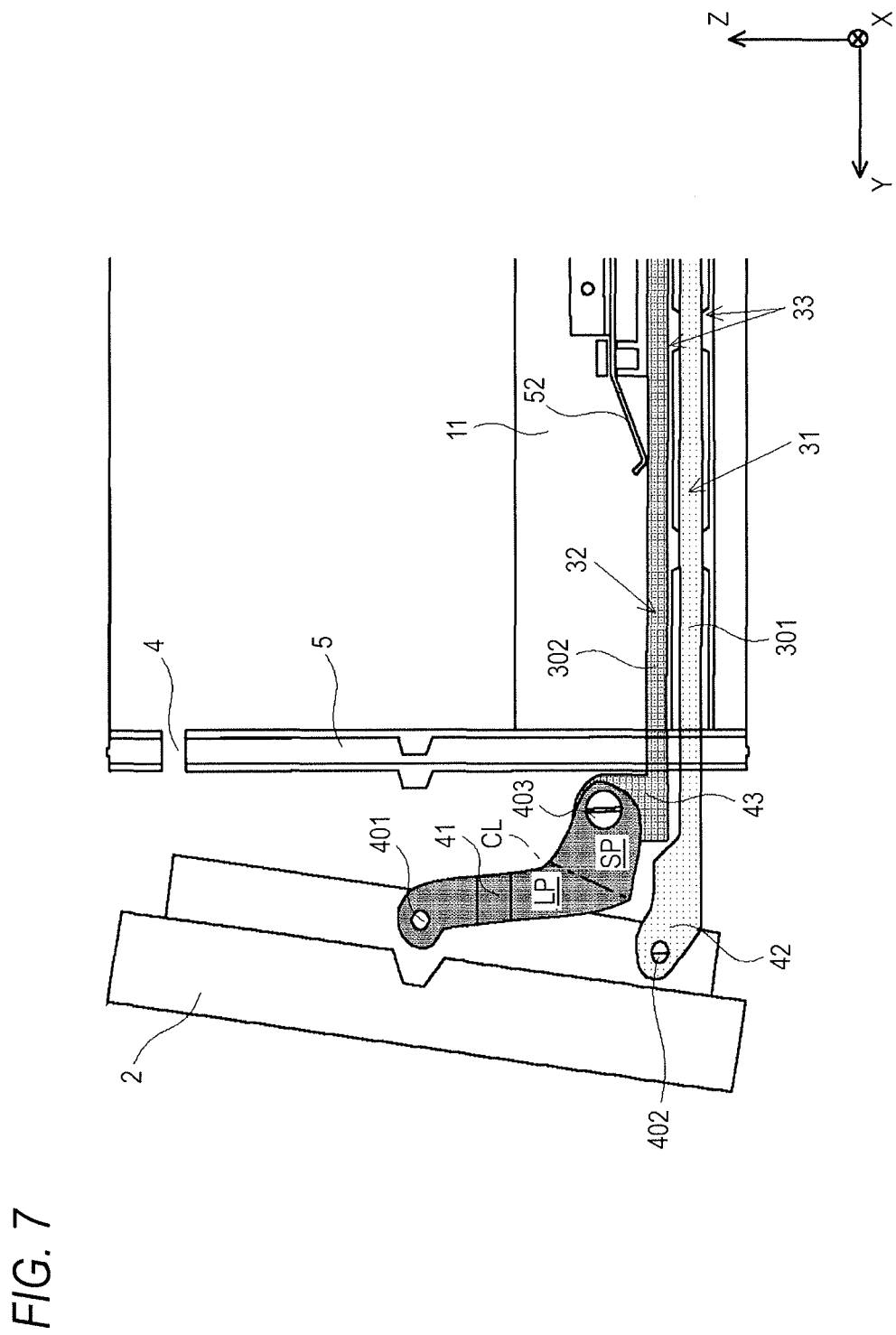
FIG. 7 is a side view depicting a part of the electronic device in the state where the display panel has moved forwards.

When the user operates a command button displayed on the display 3 or a physical operation button, for example, an instruction signal for operating the display panel 2 is output. The motor 21 starts an operation in response to the instruction signal, and drives the plurality of gears 22. The plurality of gears 22 is driven, so that the sliding member 301 engaged with one of the plurality of gears 22 is moved forwards (the +Y direction), as shown in FIGS. 5 and 7. That is, the main slider 31 is moved forwards.

As each sliding member 301 is moved, each coupling pin 51 engaged with the front end portion of each pin sliding path 101 is moved forwards (the +Y direction) along each guide path 102 from the rear end portion thereof. Accompanied by this movement, the corresponding sliding member 302 of the sub-slider 32 also starts to move forwards. That is, as the main slider 31 is moved, the sub-slider 32 is moved in the same direction as the main slider 31.

As each sliding member 302 of the sub-slider 32 is moved, the corresponding motion link 41 supported to the shaft 403 provided for each arm part 43 also starts to move forwards. Also, since the arm part 42 of each sliding member 301 also starts to move forwards, the display panel 2 is moved forwards. At this time, since each arm part 42 is moved forwards earlier than the motion link 41, the display panel 2 is moved with an inclined posture where the upper end thereof is located slightly posterior to the lower end thereof.

Figure 6:
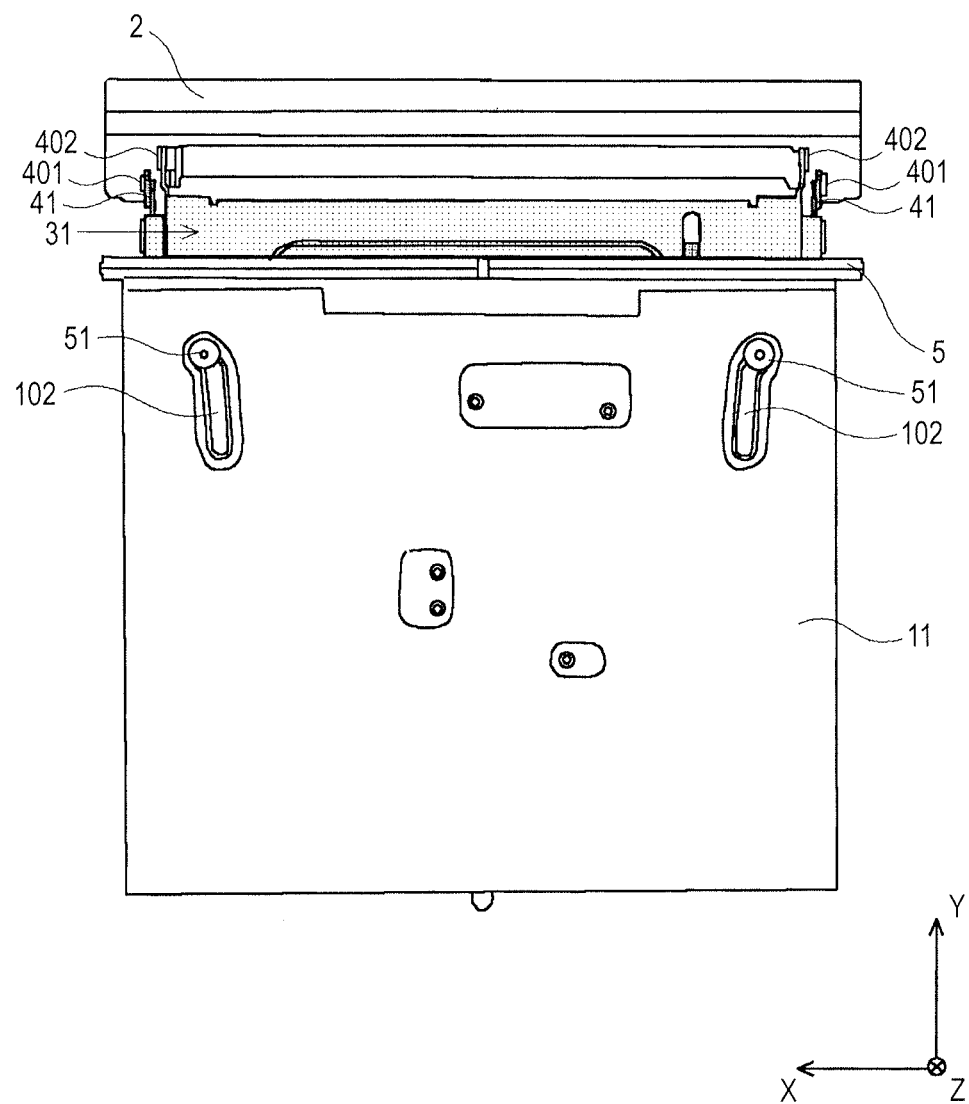
FIG. 6 is a bottom view depicting a part of the electronic device in the state where the display panel has moved forwards.

As each sliding member 302 is moved, each coupling pin 51 reaches the front end portion of the corresponding guide path 102 and stops, as shown in FIG. 6. In this state, since each coupling pin 51 can continue to move along the corresponding pin sliding path 101, the corresponding sliding member 301 continues to move forwards. In other words, each coupling pin 51 moves towards the rear end along the corresponding pin sliding path 101, so that it moves rearwards relative to the corresponding sliding member 301.

In the below, an operation that is performed until the display panel 2 shown in FIGS. 5 and 7 reaches the inclined state from a state where the display panel has moved forwards (the +Y direction) by a predetermined distance is described with reference to FIGS. 8 to 10.

Figure 8:
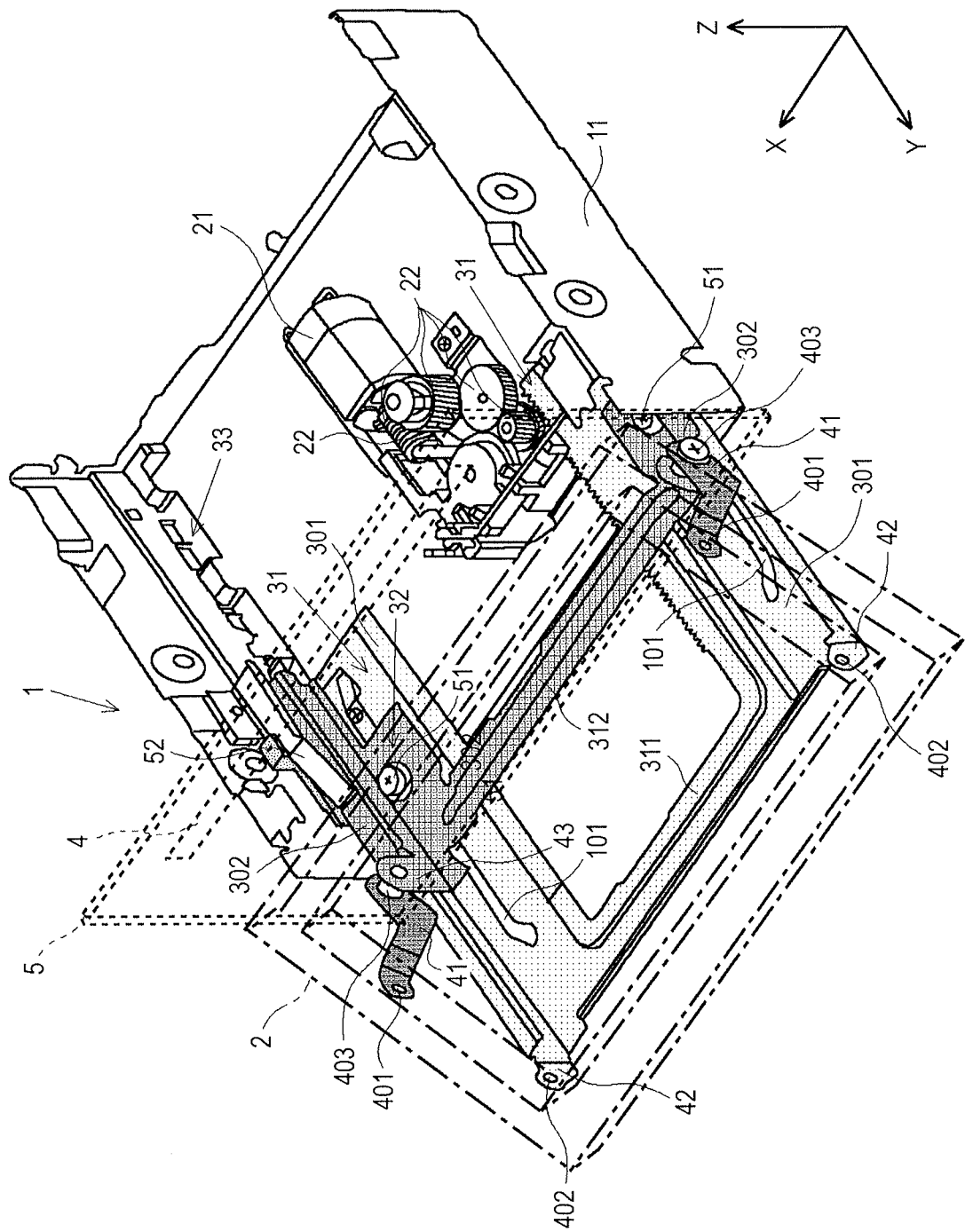
FIG. 8 is a perspective view depicting a part of the electronic device in an inclined state of the display panel.

After each coupling pin 51 reaches the front end portion of the corresponding guide path 102, the arm part 42 of the sliding member 301 continues to move forwards (the +Y direction), so that the lower end of the display panel 2 moves forwards, as shown in FIG. 8. Thereby, the display panel 2 is tilted so that the front surface (the display surface) thereof faces upwards obliquely. Upon the start of the operation, the upper end of the display panel 2 is spaced forwards from the surface (front surface) of the front panel 5, as shown in FIG. 7. For this reason, when the display panel 2 transitions to the inclined state, the display panel 2 is not contacted to the surface of the front panel 5.

Figure 9:
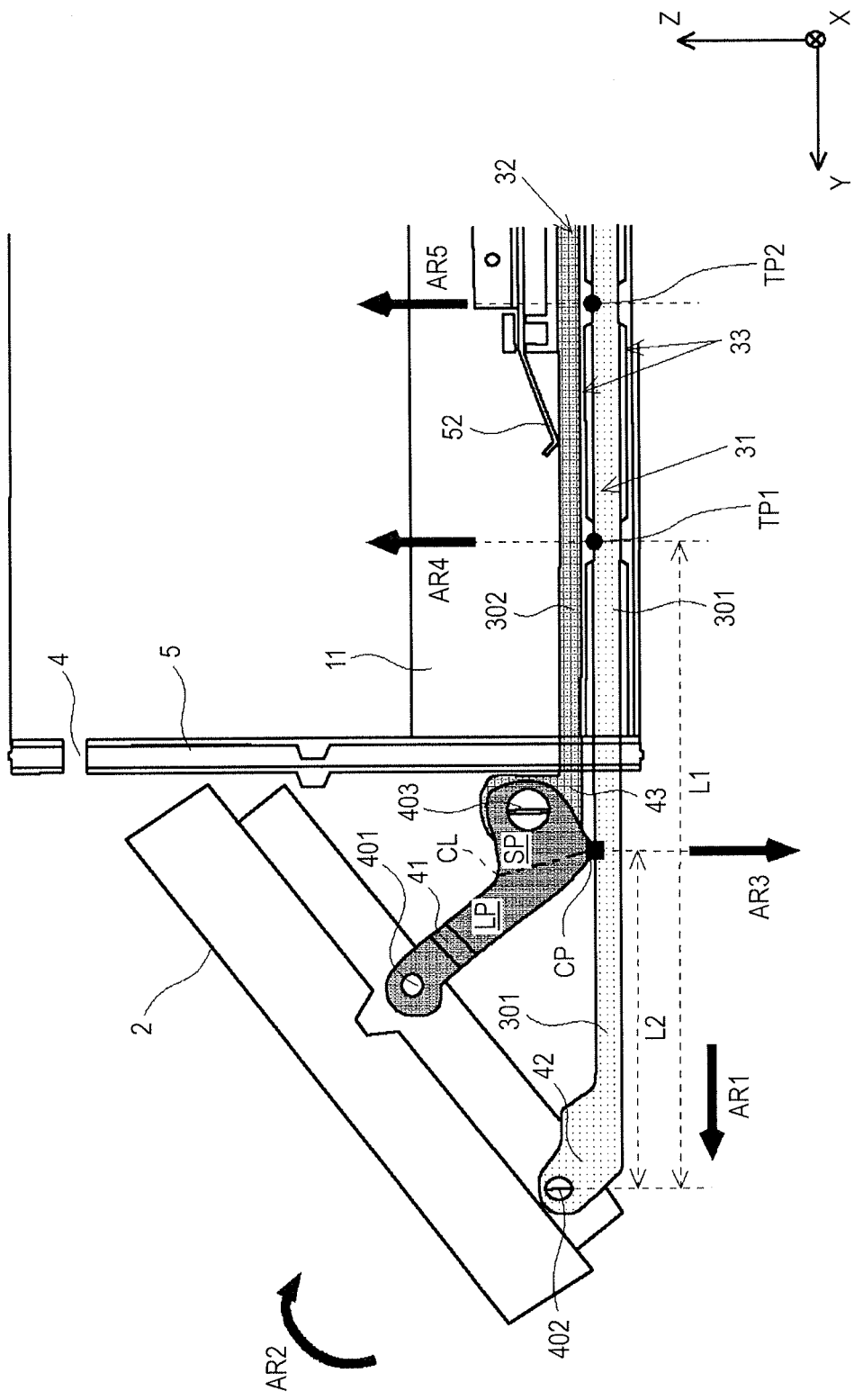
FIG. 9 is a side view depicting a state where a motion link of the electronic device is in contact with a main slider.

When the display panel 2 is tilted, each motion link 41 is contacted to the main slider 31, as shown in FIG. 9. Specifically, a corner part CP (a part shown with a black square) of each motion link 41 is contacted to the corresponding sliding member 301. The bent part CL of the motion link 41 forms a corner part that is convex towards the corresponding sliding member 301. The corner part CP corresponds to the corner part.

Since the corner part CP, which is convex towards the corresponding sliding member 301, is contacted to the driving member 301, the corner part CP and the corresponding sliding member 301 are contacted to each other immediately after the display panel 2 is tilted as the sliding member 301 is moved. Thereby, when the display panel 2 is tilted, the bending of each sliding member 301 is immediately suppressed, so that it is possible to suppress an abnormal sound from each member upon the change in posture of the display panel 2 and in the inclined state. In the meantime, at the time that each corner part CP and the corresponding sliding member 301 are contacted to each other, each coupling pin 51 is positioned between the front end portion and the rear end portion of the corresponding pin sliding path 101.

Herein, an operation that is performed until each corner part CP and the corresponding sliding member 301 are contacted to each other is described in detail. Each sliding member 301 is moved by a first distance, which is the predetermined distance, towards the front (the +Y direction) shown with an arrow AR1 in FIG. 9, so that the display panel 2 is rotated in a clockwise direction (as seen from a right side) shown with an arrow AR2 about the respective shafts 401, 402 serving as the rotary shafts. On the other hand, as can be clearly seen from the comparison of FIGS. 7 and 9, each motion link 41 is rotated in a counterclockwise direction (as seen from a right side) about the corresponding shaft 403. As a result, the corner part CP of each motion link 41 and the corresponding sliding member 301 are contacted to each other, and a downward (vertical direction) force (bias) shown with an arrow AR3 is applied to the contact part thereof. The first distance by which each sliding member 301 moves is about 10 cm on the basis of the position of the member 301 in the fixed state of the display panel 2, for example.

Herein, the parts of the plurality of convex portions provided for the respective guide rails 33, which are contacted to the corresponding sliding member 301, are denoted as contact parts TP1, TP2 shown with black circles. For example, a contact part between the contact part TP1 and the sliding member 301 is denoted as a first support point, and a distance from the first support point to the shaft 402 is denoted as a distance L1. On the other hand, a contact part between the contact part TP2 and the sliding member 301 is denoted as a second support point, and a distance from the second support point to the shaft 402 is denoted as a distance L2. The distance L1 is greater than the distance L2. As a result, regarding the moment generated at the shaft 402, the moment based on the second support point is less than the moment based on the first support point. In this way, the second support point is provided in addition to the first support point, so that it is possible to securely suppress the bending of the sliding member 301, thereby suppressing the abnormal sound from each member upon the change in posture of the display panel 2 and in the inclined state. As a result, the stability of the posture change operation of the display panel 2 is also improved.

On the other hand, the downward force (bias) shown with the arrow AR3 is applied at the second support point, so that an upward force (bias) shown with an arrow AR4 is applied at the first support point. Also, an upward force (bias) shown with an arrow AR5 is applied to the contact part between the contact part TP2 and the sliding member 301. In this way, the upward forces are received by the plurality of convex portions provided for the respective guide rails 33, so that it is possible to securely suppress the bending of each sliding member 301. Also, the corner part CP of each motion link 41, which is used when tilting the display panel 2, is brought into contact with the corresponding sliding member 301. Thereby, as compared to a configuration where a member configured to contact each sliding member 301 is newly provided on a backside of the display panel 2, for example, it is possible to reduce the number of components, thereby saving the manufacturing cost.

Figure 10:
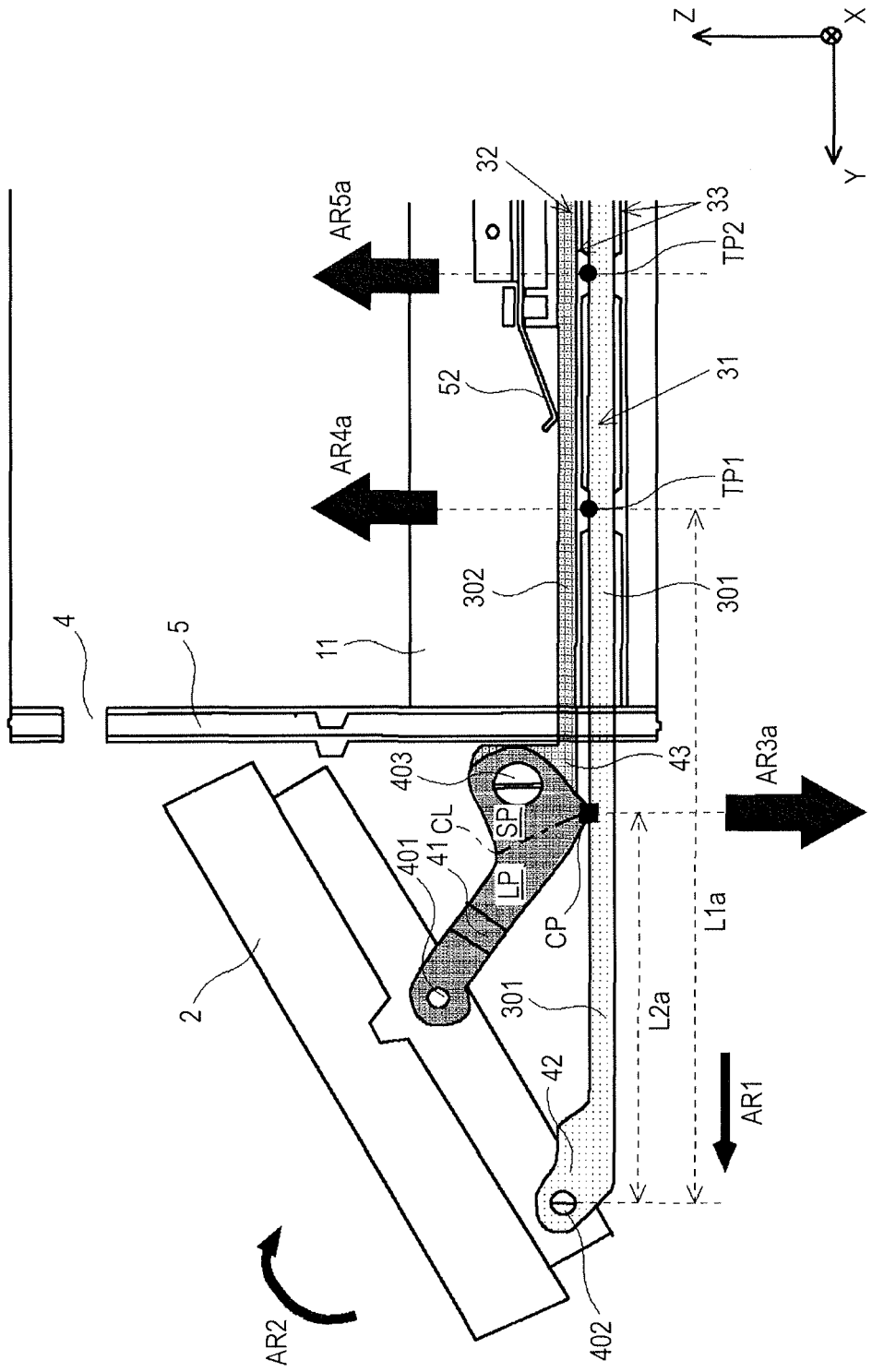
FIG. 10 is a side view depicting a state where the motion link further moves by a predetermined distance after contacting the main slider.

As shown in FIG. 10, even after each corner part CP is contacted to the corresponding sliding member 301, each sliding member 301 is further moved forwards by the second distance. The second distance is about 5 mm, for example. In this state, each coupling pin 51 is engaged with the rear end portion of the pin sliding path 101 formed in the corresponding sliding member 301.

At this time, a weight of the display panel 2 and a force with which the display panel 2 is tilted in the rotating direction of the arrow AR2 are composed, so that a downward force denoted by an arrow AR3*a* is generated at the second support point. That is, the force stronger than the downward force denoted with the arrow AR3 of FIG. 9 is applied to each sliding member 301. In addition to this configuration, since each coupling pin 51 is engaged to the rear end portion of the corresponding pin sliding path 101, even when the vibrations are transmitted from a vehicle body, each sliding member 301 is difficult to be displaced and deformed and the display panel 2 is difficult to be shaken. Therefore, it is possible to suppress the abnormal sound from each member upon the change in posture of the display panel 2 and in the inclined state and to secure the stability of the posture change operation of the display panel 2.

In this way, even after each corner part CP and the corresponding sliding member 301 are contacted to each other, each sliding member 301 is further moved forwards, so that each motion link 41 continues to rotate in the counterclockwise direction (as seen from a right side) and the downward force (bias) denoted with the arrow AR3*a* increases at the contact part thereof. Thereby, it is possible to further increase the rigidity of each sliding member 301 against the vibrations to be transmitted from the vehicle body. As a result, the bending of each sliding member 301 is suppressed, so that it is possible to further suppress the abnormal sound from each member during the change in posture of the display panel 2 and in the inclined state. In the meantime, each sliding member 301 is moved, so that the respective distances from the first support point and the second support point to the shaft 402 are increased. Specifically, the distance L1 becomes L1a (L1<L1a), and the distance L2 becomes L2a (L2<L2a).

As the downward force increases, the upward force (bias) denoted with an arrow AR4a at the first support point (the contact part TP1) and the upward force (bias) denoted with an arrow AR5a at the second support point (the contact part TP2) increase. However, since the corresponding forces are received by the plurality of convex portions provided for the respective guide rails 33, it is possible to further suppress the bending of each sliding member 301.

When each sliding member 301 is moved and thus each coupling pin 51 is relatively retreated and reaches the rear end portion of the corresponding pin sliding path 101, as described above, a sensor (not shown) detects the reaching and stops the operation of the motor 21. Thereby, the driving of the plurality of gears 22 is also stopped and the movement of each sliding member 301 is also stopped. At this time, the display panel 2 is in the inclined state, and the disc insertion opening 4 is exposed to the user.

After the user inserts or acquires a disc through the disc insertion opening 4, the motor 21 rotates in a reverse direction to the operation of moving the display panel 2 to the inclined state. Thereby, each sliding member 301 starts to move rearwards (the −Y direction), and the display panel 2 gradually stands up.

Each sliding member 301 is moved rearwards, so that each coupling pin 51 is moved forwards (the +Y direction) from the rear end portion of the corresponding pin sliding path 101. When each coupling pin 51 reaches and is engaged to the front end portion of the corresponding pin sliding path 101, each coupling pin 51 starts to move along the corresponding guide path 102. Thereby, the display panel 2 is moved rearwards with the posture where the display surface faces upwards obliquely to some extent. As a result, the upper end portion of the display panel 2 is first contacted to the front panel 5 earlier than the lower end portion to which the driving force is applied. Thereby, the adhesion of the display panel 2 to the main body 1 is improved.

Modified Embodiments

Although the illustrative embodiment of the present invention has been described, the present invention is not limited to the illustrative embodiment and a variety of modifications can be made. In the below, modified embodiments are described. All aspects including the above illustrative embodiment and modified embodiments to be described below can be appropriately combined.

In the above illustrative embodiment, each motion link 41 is a single member having the first part LP and the second part SP. However, each motion link 41 may also be formed by bonding a plurality of members. For example, each motion link 41 may have a configuration where the first part LP and the second part SP provided as separate members are bonded at the bonding part CL.

Also, each motion link 41 may have another appropriate shape inasmuch as it accomplishes the above operational effects by changing the posture of the display panel 2 and contacting the corresponding sliding member 301.

In the above illustrative embodiment, the electronic device 10 is fixed to the vehicle such as an automobile. However, the electronic device 10 may also be fixed in other places of buildings such as home, a store, an office, a factory and the like.

In the above illustrative embodiment, the control functions of the electronic device 10 are implemented in the software manner by the calculation processing of the CPU in accordance with the programs. However, some of the control functions may be implemented by an electrical hardware circuit.

A Japanese Patent Application No. 2014-071864 filed on Mar. 31, 2014 and configuring a part of the present application is herein incorporated for reference.

The invention claimed is:

1. An electronic device comprising:
    a main body having a fixing surface;
    a display unit having a display surface for displaying information;
    a first movement part directly connected to a lower end portion of the display unit and configured to linearly reciprocally move relative to the main body;
    a second movement part configured to reciprocally move in parallel with the first movement part;
    a support part configured to support the display unit;
    a first connection part to which the lower end portion of the display unit is to be connected to be rotatable relative to the first movement part;
    a second connection part provided between the lower end portion and an upper end portion of the display unit and to which the display unit and one end portion of the support part are to be connected to be relatively rotatable, and
    a third connection part to which the other end portion of the support part is to be connected to be rotatable relative to the second movement part,
    wherein:
        the display unit can transition between a fixed state and an inclined state in accordance with the reciprocal movement of the first movement part,
        in the fixed state, the upper end portion and the rear end portion of the display unit are fixed to the fixing surface,
        in the inclined state, the display unit is spaced from the fixing surface and the display surface faces upwards obliquely, and
        when the first movement part moves forward by a first distance from a position in the fixed state, the support part contacts the first movement part.

2. The electronic device according to claim 1, wherein the first movement part is configured to further move forward by a second distance after the first movement part contacts the support part until the display unit reaches the inclined state.

3. The electronic device according to claim 2, wherein:
    the first movement part has a sliding path extending in a direction of the reciprocal movement,
    a coupling pin is inserted into the second movement part and the sliding path and is configured to slide along the sliding path,
    the coupling pin is positioned between a front end portion and a rear end portion of the sliding path when the first movement part and the support part first contact each other, and the coupling pin is engaged with the rear end portion of the sliding path when the first movement part moves forward by the second distance.

4. The electronic device according to claim 1, wherein:
the support part has a bent shape so as to form a corner part convex towards the first movement part, and
the corner part is in contact with the first movement part.

\* \* \* \* \*